(No Model.) 2 Sheets—Sheet 1.
J. LEVEY, T. H. BUTLER & C. A. MacDONALD.
REFRIGERATING MACHINE.
No. 508,141. Patented Nov. 7, 1893.
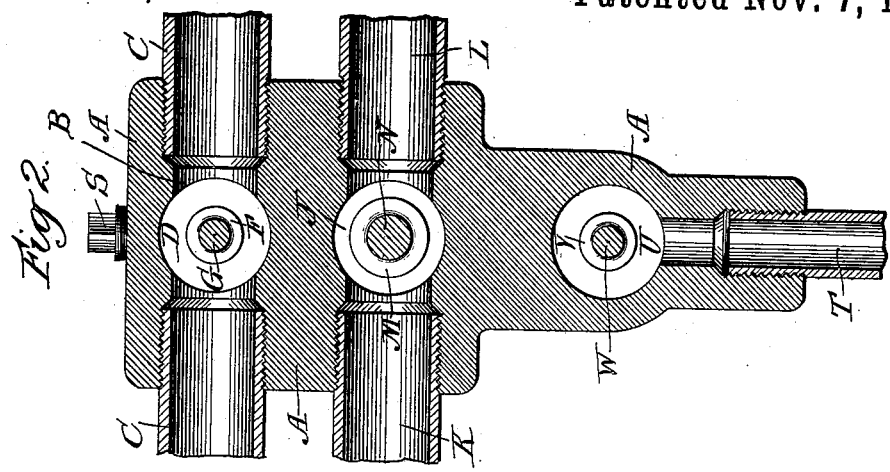
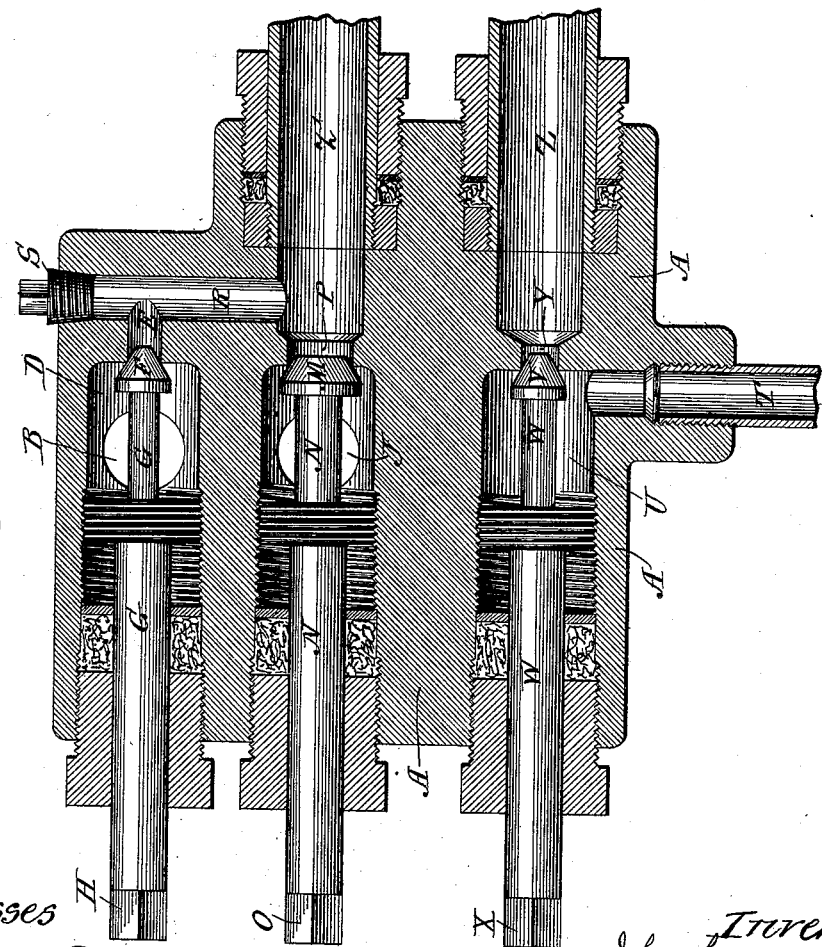

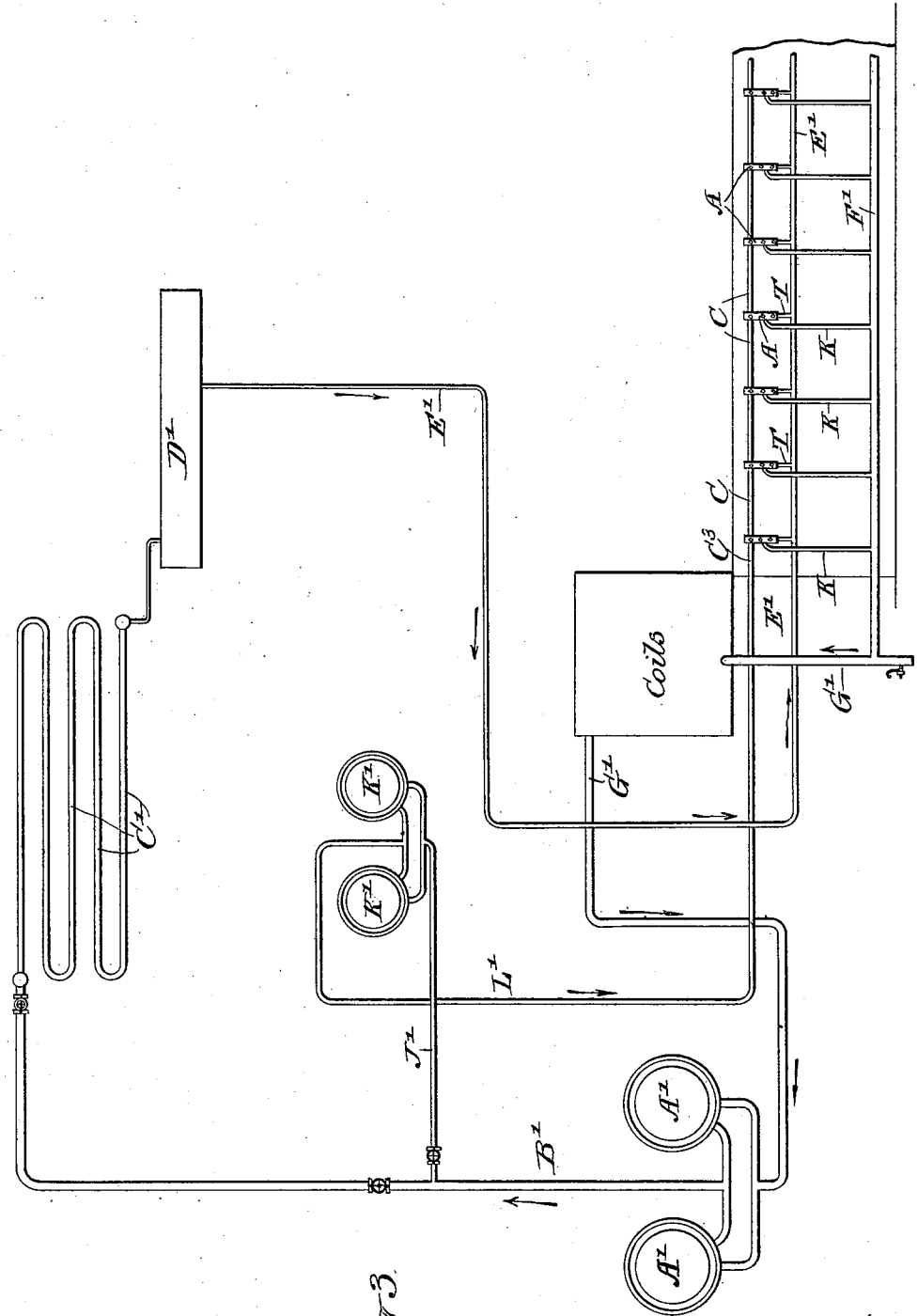

UNITED STATES PATENT OFFICE.

JOHN LEVEY, THOMAS H. BUTLER, AND CHARLES A. MacDONALD, OF CHICAGO, ILLINOIS, ASSIGNORS TO THE HERCULES IRON WORKS, OF SAME PLACE.

REFRIGERATING-MACHINE.

SPECIFICATION forming part of Letters Patent No. 508,141, dated November 7, 1893.

Application filed November 16, 1892. Serial No. 452,209. (No model.)

*To all whom it may concern:*

Be it known that we, JOHN LEVEY, a subject of the Queen of England, and THOMAS H. BUTLER and CHARLES A. MACDONALD, citizens of the United States, and residents of Chicago, Cook county, Illinois, have invented a new and useful Improvement in Refrigerating-Machines, of which the following is a specification.

Our invention relates to refrigerating machines and has for its object to provide certain arrangements of parts and certain devices whereby to most easily and satisfactorily accomplish the work of refrigerating or freezing ice, and then melting such ice from the plates upon which it is formed.

It is illustrated in the accompanying drawings, wherein—

Figure 1 is a longitudinal section through the distributing valve. Fig. 2 is a cross section through the same. Fig. 3 is a diagrammatic view of a refrigerating plant showing the system which we employ, and the relative position of the distributing valves.

The like parts are indicated by the same letter in all the figures.

A is a valve body proper, having through one end a passage-way B, to the opposite ends of which passage-way are screw-threaded the pipes C C,—the other ends of such pipes C C being in like manner screw threaded into the opposite ends of the next valve of the series. Thus by means of such passage-way and these successive pipe sections a continuous passage is made through the several valves. Within the valve case is a chamber D, and leading therefrom is a passage E controlled by a valve F on the end of the valve-stem G, which passes out through a stuffing box and terminates in an end H adapted for the application of a wrench or the like so that the valve can be reciprocated. About midway of the valve case is a similar arrangement of parts, there being a passage-way J, pipes K, L, valve M, stem N and wrench end O. From this passage way J leads the short passage P, into which opens the transverse passage R, which is controlled by the plug S and connects the passage E with the passage P. The pipe L may be dispensed with as indicated in part by Fig. 3, in which case the passage J will not lead entirely through the valve case, but will be a closed chamber with an outward passage at one side only for the pipe K. At the other end of the valve case is a leading-in pipe T, opening into a chamber U controlled by a valve V on stem W,—valve V on stem W being provided with a wrench head X.

Y is a passage way leading from the chamber U and controlled by the valve V, and Z is a pipe leading from such passage way. Suitable stuffing boxes and packing material and chambers therefor are provided as occasion may require.

Z' is a pipe leading from the chamber or passage way P. We do not illustrate the coils or freezing plates since they are no part of the present invention, except as constituting part of the system, but the pipes Z and Z' are shown as broken off—in fact, they are the terminals of such coil.

Referring to the diagrammatic view, A' are the compressors adapted to discharge the hot compressed gas into the pipe B', whence it is led to the condensing coils C', there to be liquefied. The liquid is discharged into the receiver D'; hence, it flows through the pipe E' into the short pipes T, and thence, through the chambers U and Y into the one end Z of the refrigerating coil, where after circulating and expanding, it returns to the other end of the coil Z', whence, it is discharged through the pipes K, or the pipes K L, if the latter are used into the return main F', whence it is led back through the pipes and coils G' G' to the compressors to be again compressed and re-used.

J' is a branch from the pipe B' leading to the supplementary compressors K' K', whence leads the pipe L' to the short pipes C C, and thus through the chamber or passage B D in the valve.

It will be quite evident that the arrangement of parts and the construction of the particular devices might be greatly altered without departing from the spirit of the invention, and we do not wish to be limited to the precise form or arrangement of construction shown.

The use and operation of our invention are as follows: Assuming that the device substantially as shown diagrammatically be provided with a series of plates for freezing, associated, one perhaps with each valve A, the circulation of the freezing fluid will be as follows: The compressors A' A' being set in operation will take the spent gas and compress it, leaving it a hot compressed fluid, and they will drive it through the pipe B' into the liquefying coils, whence it will be carried to the liquid receiver, and will thence be distributed to the valves. It enters each valve at the pipe T, and if the plates associated with that valve are in readiness for forming ice, the valve V will be lifted sufficiently to permit a suitable quantity of such liquid to enter the freezing coil at the terminal Z. It will expand in the freezing coils and return to the opposite terminal Z' when its work of freezing has been completed. Here, if the valve M be open and the valve F be closed, the spent gas will return by the pipes K or L into the return main F', whence it will be drawn by the compressors A' into such compressors to be recompressed and begin anew its cycle of treatment. When the freezing plate associated with any valve has completed its freezing process, and the cakes formed are sufficiently thick, it is necessary to remove the plates, and this is most readily done by melting them off, or warming the plates until the ice is ready to escape. To do this, it is necessary to use the same gas, and to accomplish this, we provide secondary compressors K' K', which take the hot compressed gas and re-compress it so as to put it under a much higher tension, and this gas they drive through the pipe L' into the receiver valve cases. Now, if the valve M be closed and the valve F be opened, it is evident that the freezing coil of which the pipes Z and Z' are the terminals will be connected between the compression sides of the two sets of compressors; but the gas expelled by the compressors K' K' being under higher tension than the liquefied gas from the compressors A' A', will pass reversely from the coil Z' to Z, and being a hot gas will give up its heat to the plates, and while itself becoming, in part at least, liquefied, will melt off the cakes of ice from the freezing plates. This process is continued as long as may be necessary, and the liquid thus resulting from the process of melting off the plates will be returned through the pipe T to the liquid chamber. When the cakes of ice have been removed, the valves may be restored to their original positions, whereupon the liquid resulting from the last described process commingling with the liquid normally produced by the compressors A' A', and condenser C' will be forced into the freezing coils, and the process of freezing new cakes will begin.

The coils may be described as the expansion or freezing coils, and the secondary compressor may be described as the re-compressing device.

The tank marked "coils" is a diagrammatic representation of part of the cooling or freezing apparatus proper.

We claim as our invention—

1. In an apparatus for the production of ice, the combination of a compressor, liquefier, expansion coils or chamber, with pipes connecting them in series and a pipe leading from between the compressor and the liquefier to a point between the compressor and the expansion coils and a re-compressor or supplementary compressor in such latter pipe for the purpose of heating the expansion pipes so as to release the ice therefrom.

2. In an apparatus for the production of ice, the combination of a compressor, liquefier, expansion coils or chambers, with pipes which connect them in series so as to tend to maintain a continuous circulation in a given direction, and a supplementary or re-compressor, and pipes connecting it with the system of pipes so that they tend to maintain the circulation through the coils in the opposite direction at a higher pressure for the purpose of heating the expansion pipes so as to release the ice therefrom.

3. In an ice machine, a valve provided with a case having an induction passage at one end, a valve controlling the same, and a pipe connecting such induction passage with the freezing coil, a second passage entering such valve case, a valve controlling such second passage, and a pipe leading thence and connecting with the other end of the freezing coil; a third passage in such valve case, a pipe leading to or through the same, and a passage leading from such third passage to the second passage which leads to one end of the coil.

JOHN LEVEY.
THOMAS H. BUTLER.
CHARLES A. MacDONALD.

Witnesses for Levey and MacDonald:
WALTER J. GUNTHORP,
EMMA ELLIOTT.

Witnesses for Butler:
W. H. FREEMAN,
H. B. NICHOLS.